Apr. 3, 1923.                                          1,450,432
                    J. W. CROSS
             FLUID PRESSURE BRAKING APPARATUS
               Filed Sept. 18, 1919           2 sheets-sheet 1

Inventor
James W. Cross
by Herbert W. Jenner
   Attorney

Apr. 3, 1923.

J. W. CROSS 1,450,432

FLUID PRESSURE BRAKING APPARATUS

Filed Sept. 18, 1919

Inventor.
James W. Cross
by Herbert W. Jenner
Attorney.

Patented Apr. 3, 1923.

1,450,432

UNITED STATES PATENT OFFICE.

JAMES WILLIAM CROSS, OF SURBITON, ENGLAND.

FLUID-PRESSURE BRAKING APPARATUS.

Application filed September 18, 1919. Serial No. 324,334.

*To all whom it may concern:*

Be it known that I, JAMES WILLIAM CROSS, a subject of the King of Great Britain and Ireland, residing at Surbiton, in the county of Surrey, England (whose post-office address is Newlands, Ditton Hill, Surbiton, in the county of Surrey, England), have invented certain new and useful Improvements Relating to Fluid-Pressure Braking Apparatus; and I do hereby declare the following to be a full, clear, and exact description of the invention, such as will enable others skilled in the art to which it appertains to make and use the same.

This invention relates to fluid pressure braking apparatus, for railway and like vehicles, of the well known type comprising a triple valve adapted to control communication between the train pipe and auxiliary reservoir on the vehicle, between the said reservoir and the brake cylinder for applying the brakes and between the brake cylinder and atmosphere or exhaust receptacle for releasing the brakes.

The present invention has for its principal object to provide a triple valve embodying, in addition to the normal functions of a valve of this character, as regards the charging of the auxiliary reservoir and application of the brakes, means whereby the release of the brakes, after an application thereof, can be graduated or effected by degrees so as to maintain any desired subsequent degree of braking pressure, and complete release of the brakes can be effected when desired. The invention therefore consists broadly of a triple valve so constructed, that, or provided with means whereby, a graduated release of the brakes, after an application thereof, can be effected.

Further according to this invention the triple valve is so constructed that its piston, subject as in the ordinary types of triple valve to the opposing pressures obtaining in the auxiliary reservoir and train pipe, controls directly communication only between the train pipe and the auxiliary reservoir and between the auxiliary reservoir and the brake cylinder, communication between the brake cylinder and atmosphere or an exhaust receptacle, into which the fluid under pressure in the brake cylinder is vented during release, being controlled by a separate valve mechanism (hereinafter called the "release valve") the opening action of which (to establish communication between the brake cylinder and exhaust) is effected directly or indirectly by the action of the triple valve piston. The closing action of this separate release valve mechanism is arranged to be effected by pressure of fluid admitted to or obtaining in the brake cylinder and having access to the release valve or to a piston connected therewith. Further this piston, which is a secondary piston, i. e. a piston separate from the triple valve piston, under certain conditions moves the triple valve piston and parts connected therewith this movement being effected by fluid, at the pressure obtaining in the brake cylinder, acting on the secondary piston. A suitable spring is also preferably provided and arranged so that it exerts a constant pressure on the release valve, or on the secondary piston, tending to close the release valve, this spring being provided for the purpose hereinafter mentioned.

Further the present invention comprises means whereby in the charging of the auxiliary reservoir with compressed air from the train pipe as soon as the pressure reaches a predetermined amount, for instance about sixty-five pounds per square inch, the flow of air from the train pipe to the auxiliary reservoir takes place at a reduced speed until the reservoir is fully charged with compressed air at the "running" pressure usually seventy-five pounds per square inch. Such means for varying the speed of flow of the compressed air to the auxiliary reservoir according to one embodiment of the present invention consists of a suitable valve device (hereinafter referred to as the "feed valve") the casing of which is secured to the casing or body of the triple valve and arranged so as to communicate with the spaces in the casing, both on the auxiliary reservoir side and on the train pipe side of the triple valve piston, the valve being connected with a diaphragm or the equivalent within the valve casing and arranged so that on one side it is subjected to the train pipe pressure obtaining on the train pipe side of the triple valve piston when in its normal or "running" position, the opposite side of the diaphragm being subject to the pressure of a suitable spring which when the train pipe pressure on the diaphragm is below the predetermined amount holds the valve open in opposition to the spring; when however the train pipe pressure on the diaphragm, in opposition to the spring, reaches and exceeds the predetermined pressure (for instance sixty-five pounds per square inch) it causes the diaphragm to close the valve and hold it closed against the action of the spring, the valve thus closing communication, through suitable ports or passages, between the train pipe side of the triple valve piston and the space in the triple valve casing in direct communication with the auxiliary reservoir whereupon the further flow of compressed air to the auxiliary reservoir takes place through a very small leak groove or leak port which may be (as in the case of the ordinary triple valves) formed in the wall of the triple valve piston chamber.

Further the present invention consists in an improved triple valve having the several parts constructed, combined and adapted to operate substantially as hereinafter described with reference to and shewn in the accompanying drawings for the purposes set forth.

In the drawings, which illustrate by way of example one embodiment of the invention:—

Fig. 5 is an end elevation, drawn to a larger scale than Fig. 1, of the sleeve connected to the triple valve piston and hereinafter referred to.

Like reference numbers indicate corresponding parts in the several figures of the drawings.

Figure 1:
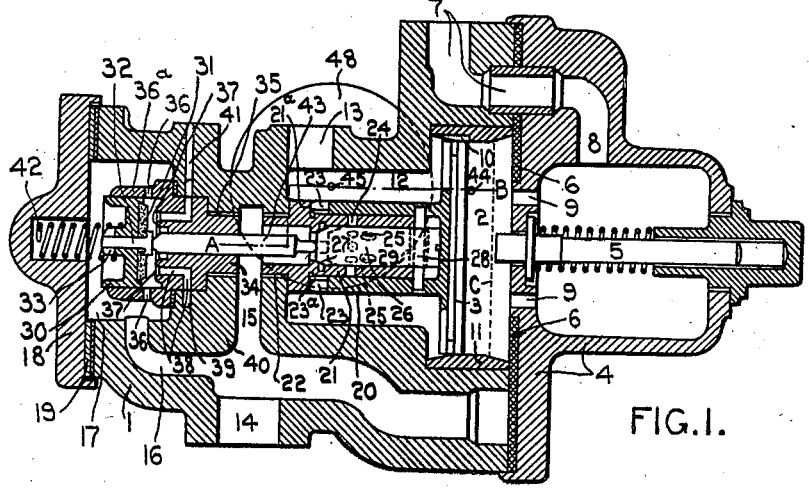
Fig. 1 is a sectional elevation of a triple valve according to the invention.
Figure 4:
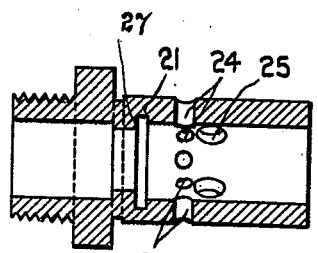
Figs. 3 and 4 are detail views, drawn to a larger scale than Fig. 1, and respectively in outside elevation and longitudinal sectional elevation, of the tubular member forming the seat for the slide valve connected with the triple valve piston, and for the plug valve also connected with the triple valve piston, as hereinafter described.
Figure 3:
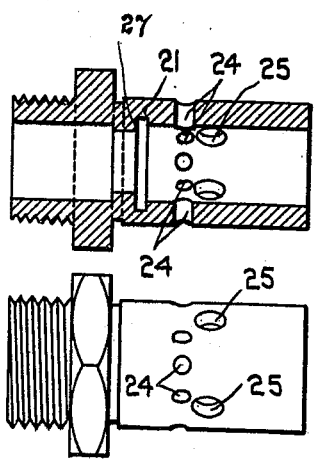

1 is the casing or body of the triple valve, 2 the piston chamber in the said casing and 3 the triple valve piston, the parts 2 and 3 being substantially the same as the corresponding parts of the well known triple valves. 4 is the end cover of the triple valve casing and 5 the spring pressed rod known as "the graduating stem" working in suitable guides in the cover 4 these parts being substantially the same as the corresponding parts in the well known triple valves. The cover 4 is secured to the body or casing 1 of the triple valve in the usual manner by bolts and nuts, 6 being the usual leather gasket between the parts 1 and 4. 7 is the port in the casing 1 in communication, in the usual or any suitable manner, with the train pipe and 8 the port or passage in the cover 4 registering with the said port 7 and through which compressed air from the train pipe enters the space in the cover 4, 9 being the usual ports in the cover 4 through which the compressed air passes into the triple valve piston chamber 2. 10 is a very small groove or channel formed in the wall or lining 11 of the piston chamber 2, the groove 10, in the position of the triple valve piston 3 as shewn, permitting compressed air to flow from the chamber 2 through the said groove into the space 12 in the triple valve casing 1 the said space 12 being in communication, in the usual or any suitable manner, through the port 13 in the wall of the casing, with the auxiliary reservoir. 14 is the port in the body or casing 1 communicating directly through the usual pipe connection with the brake cylinder the said port 14 being also in communication with a cavity 15 and with a passage 16 in the casing 1 the passage 16 being itself in communication with the said cavity 15 and with a chamber 17 formed in the casing 1. 18 is an end cap or cover on the casing 1 and closing the chamber 17 this cover 18 being secured to the casing 1 in any suitable manner, for instance by means of nuts and bolts as in the case of the usual cover 4, 19 being a leather or suitable gasket between the cover 18 and the end of the casing 1. 20 is a tubular stem attached to (as shown formed integrally with) the triple valve piston 3 and 21 is a tubular member screwed at 22 into a suitable hole in the body 1 the said tubular member being as shewn embraced by the tubular stem 20 of piston 2 which stem forms a slide valve having its seat on the periphery of the tubular member 21 the contacting surfaces of these parts being suitably machined or ground to make a good sliding fit. 23 are ports in the form of slots of suitable dimensions in the inner end of the tubular stem 20 a suitable number of these ports being provided. 24 are relatively small ports in the tubular member 21 a suitable number of these ports being provided. 25 are larger ports in the tubular member 21 adjacent to the ports 24 a suitable number, for instance as shewn four, of these larger ports being provided. 26 is a solid cylindrical or plug valve slidably mounted within the member 21 in which a seat is provided at 27 on which the inner end of the valve 26 seats when in the position shewn. The valve 26 is operatively connected with the tubular stem 20 of the piston 2, for instance as shewn, by means of a pin 28 extending through holes in the stem 20 and a hole 29 in the plug valve 26 the ends of the pin 28 being preferably riveted over in countersunk holes in the stem 20 as shewn. 30 is a piston to the inner side of which is secured a leather or rubber face or disc 31, for instance by means of the bolt 32 and nut 33, these parts forming the hereinbefore mentioned separate exhaust or release valve. As shewn the piston 30 is slidably fitted within a piston chamber formed in the outer end of the valve seat member 34 the inner end of which member is screwed at 35 into the portion 40 of the body or valve casing 1. 36 are radially arranged ports a suitable number of which are provided in the wall 36ª of the cylinder in which the piston 30 works and forming communication between the space or chamber 17 in the casing 1 and the said cylinder. 37 are concentrically arranged annular projections on the member 34 forming seats for the valve face or disc 31. 38 are ports or passages, a suitable number of which are provided, in the valve seat member 34 these passages 38 forming communication between the piston chamber in which the valve piston 30 works and an annular cavity or recess 39 formed in the projecting portion 40 of the triple valve body or casing 1 in which the member 34 is screwed as above mentioned, the cavity 39 being in communication with atmosphere (or with a suitable exhaust receptacle) through a suitable number of passages 41 in the triple valve casing or body 1. The above mentioned concentric annular projections 37 form a double seat for the valve disc 31 when moved to position for closing communication between the ports 36 and the exhaust passages 38 and 41. 42 is a relatively light spring the inner end of which bears upon the valve piston 30 and the outer end of which bears against the bottom of the recess in the cover plate 18 as shewn, this spring 42 being normally in compression and thus tending to move the valve piston 30 into its closed position, i. e. with the valve disc or face 31 on the valve seats 37. 43 is a rod or plunger, preferably a cylindrical rod, which is a close sliding fit in a hole centrally in the valve seat member 34 the said rod extending from the plug valve 26 to the release valve 30—31 as shewn so as to contact with the head of the bolt 32 which secures the release valve face 31 to the valve piston 30. The rod or plunger 43 while free to transmit motion as between the plug valve 26 and the release valve 30—31 is in the example shewn, unconnected with either of these parts.

Figure 2:
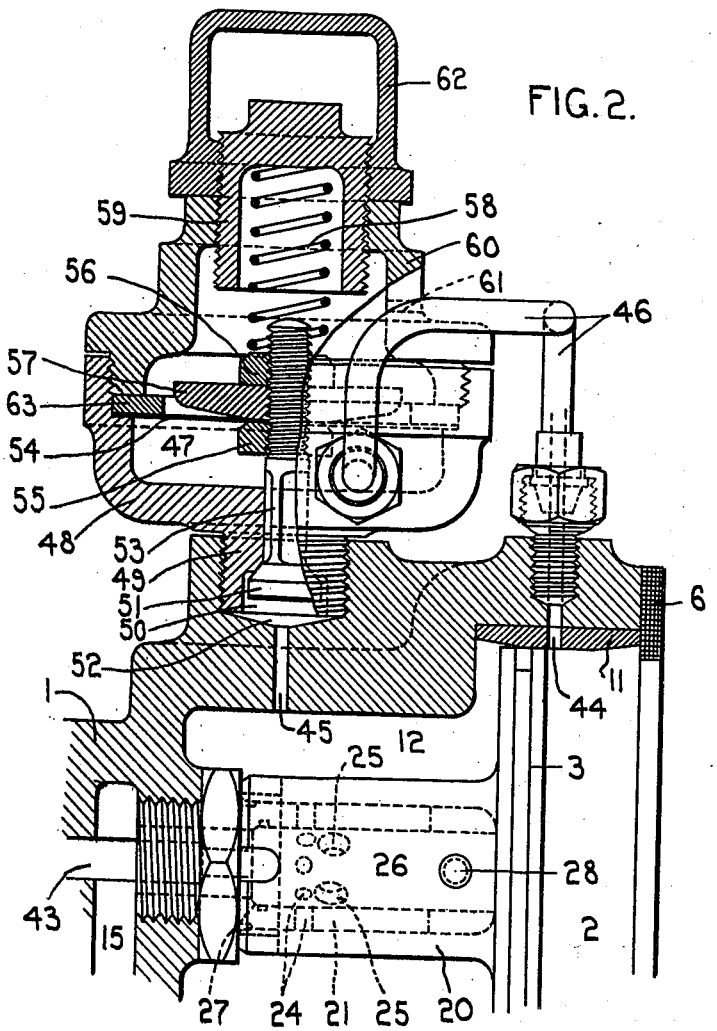
Fig. 2 is an enlarged sectional plan taken on line A—B, Fig. 1, showing the feed valve hereinafter described.

44 is a port in the wall of the triple valve casing 1 and leading into the piston chamber 2 at a position to be uncovered by the piston 3 when in the position shewn, and 45 is another port in the casing 1 and communicating with the space or chamber 12 in the casing on the auxiliary reservoir side of the piston 3. The port 44 is in communication by a pipe 46 (Fig. 2) with the chamber 47 in the casing 48 of the hereinbefore mentioned feed valve device which, by means of the screw stem 49, is crewed into the casing 1 with the chamber or recess 50, in which the valve 51 is situated, in registration with the port 45 which port, as shown in Fig. 2 leads from the bottom of a recess 52 in the casing 1, into which the stem 49 on the feed valve casing is screwed, into the space 12. As shewn in Fig. 2 the stem 53 of valve 51 is secured to a thin diphragm 54, of steel, phosphor bronze, or other suitable material, by means of nuts 55, 56. 57 is a disc of metal, or other suitable material, between the diaphragm 54 and nut 56 the pressure of the spring 58 being transmitted to the diaphragm 54 through the disc 57 the face of which, contiguous to the diaphragm 54, is suitably shaped as shewn so as to provide for proper flexing of the diaphragm under the action of the spring 58 when the train pipe pressure in chamber 47 falls below the predetermined amount as hereinafter described. The spring 58 is in compression between the box nut 59 and the nut 56, the said box nut being screwed and adjustable in an aperture in the cover 60 of the feed valve casing 48. 61 is a small port in the cover 60 forming communication between the space above the diaphragm 54 and atmosphere. 62 is a cap screwed on to the box nut 59 and forms a cover and lock nut for the nut 59. 63 is a metal or other suitable washer or ring between which and a shoulder in the casing 48 the edge of the diaphragm 54 is clamped by the cover 60 screwed into the casing 48. The spring 58 is such and is so adjusted that it is tending to move the valve 51 off its seat and will thus open said valve when the pressure of air in the chamber 47 and on diaphragm 54 falls below a predetermined amount namely about 65 lbs. per square inch, and, on the other hand, the area of the diaphragm 54 exposed to pressure is such that when the train pipe pressure and consequently the pressure in chamber 47 reaches and exceeds the predetermined amount it is sufficient to move and thus close the valve 51 on to its seat against the action of the spring 58.

Figure 5:
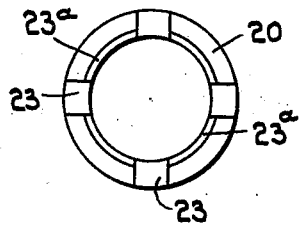

23ª (Figs. 1 and 5) is an annular recess formed in the left hand end of the tubular stem 20, the said annular recess forming communication between the several ports 23 thus ensuring the passage of air from the ports 23 to the ports 24 (or 25 as the case may be) when the triple valve piston has moved to the right for an application of the brakes as hereinbefore described.

The ports 25 in the valve seat member 21 are the "emergency" ports, that is to say when an emergency application of the brakes is made in the usual manner the triple valve piston will, as usual, move as far as possible to the right, i. e. until it comes against the leather gasket 6, in which position the ports 25 will be uncovered by both the plug valve 26 and the ports 23, 23ª in the stem 20.

Although the stem 20 has hereinbefore been referred to as a "slide valve," it need not necessarily be arranged so as to act as a slide valve, its principal object being, in conjunction with the tubular valve seat member 21, that of a guide and stop for the triple valve piston 3 for which purpose the stem 20 need not be made a close sliding fit on the periphery of the valve seat member 21. In any case the length of the stem 20 might be suitably reduced, for instance the portion in which the ports 23 are formed might be omitted, and in this case the shoulder 21ª on the valve seat member 21 would be situated further to the right so as to form an abutment for the end of the sleeve 20 when the triple valve piston is moved to the position shown in Fig. 1, in which position the left hand end of the sleeve or stem 20 may overlap and cover the ports 24.

The capacity or cross sectional area of the exhaust ports 36 (Fig. 1), while being such as to provide for release of the brakes in the same or approximately the same time as release can be effected with the well known systems of compressed air brake apparatus, is less than the capacity or cross sectional area of the ports 38 and of the ports 41 the difference between these areas being such that the fluid under pressure admitted through the ports 36 to the space on the inner side of the release valve 30—31 can escape from said space, through the ports 38 and 41, quicker than it can enter said space through the ports 36, or, in other words, the cross areas of the said ports are so proportioned that there can be no banking up of pressure on the inner side of the release valve. Further the capacity or cross sectional area of the passage 16 is made greater than that of the ports 36 to an extent sufficient to ensure that, when fluid under pressure passes through the passage 16 into the chamber 17, sufficient pressure will obtain or accumulate in the chamber 17, on the outer side of the release valve piston 30, to move the release valve on to its seat 37 as hereinafter described.

The spring 42 should only be strong enough to cause the release valve 30—31 and rod 43 to follow up the movement of the triple valve piston 3 and plug valve 26 to the right, as hereinafter described, when an application of the brakes is made. The spring 42 might be dispensed with,—it is not essential for closing the release valve 30—31,—but it is preferable to employ this spring so as to ensure that, in an application of the brakes, the release valve shall be closed on its seat 37 before fluid pressure is admitted to the chamber 17; it will be understood that if the release valve were not closed when fluid pressure is admitted to the brake cylinder a slight amount of the fluid would be wasted, by escaping through the ports 38, 41, before the release valve is closed by the fluid pressure, admitted to chamber 17, acting on the outer side of the piston 30. It is for the purpose of preventing such waste of the pressure fluid that the spring 42 is provided.

The action is as follows:—

When the brake system is being charged up compressed air flows from the train pipe, via the ports 7, 8 and 9 into the triple valve piston chamber 2 and thence past the triple valve piston 3 by way of the small feed groove 10 and also through the feed valve port 44, pipe 46 and chamber 47 (Fig. 2), past valve 51, through port 45 and, via the space 12 and port 13 in the triple valve casing 1, to the auxiliary reservoir. As soon as the pressure reaches about 65 lbs. per square inch the feed valve 51 closes (against the action of spring 58) and the charging of the auxiliary reservoir then takes place at a slower rate through the small feed groove 10 only, until it is fully charged to the "running" pressure usually 75 lbs. per square inch.

When a brake application is made the air pressure in the train pipe is reduced by the driver's valve in the usual way. The reduction in pressure on the right hand or train pipe side of the triple valve piston 3 causes the pressure on the other side to force the piston 3 to the right. This moves the plug valve 26 from its seat 27 and allows plunger 43 to move with it due to the closing movement of the exhaust valve 30, 31 which, being no longer held off its seat 37 by plunger 43, is by means of the light spring 42 moved on to the seats 37 thus closing the ports 38 and cutting off communication between the brake cylinder and atmosphere. The movement of the triple valve piston 3 to the right as above described also of course moves the tubular stem or slide valve 20 to the right the movement being such as to cause the plug valve 26 and the tubular stem 20 (by its ports 23) to uncover the ports 24 in the valve seat member 21 so that air from the auxiliary reservoir flows through ports 23 and 24 which are now open, past valve seat 27, through the left hand end of the tubular member 21 and via the cavity 15 and port 14 to the brake cylinder. This movement of the piston 3 to the right is indicated by the dotted line marked C in Fig. 1 the piston coming to rest against the end of the stem or plunger 5 as usual, the position of the piston shown by the dotted line being the position it takes up when a "service" application of the brakes is made. As the cavity 15 and port 14 are in communication, via the passage 16, with the chamber 17 in which the release valve piston 30 is located air from the auxiliary reservoir also flows through passage 16 into chamber 17 and acts on the outer side of the release valve piston 30 thus holding the release valve closed during application of the brakes. As soon as the pressure in the auxiliary reservoir is reduced slightly below the train pipe pressure the triple valve piston 3 moves to the left until the slide valve or tubular stem 20 and the plug valve 26 cut off the ports 23 and 24 the plug valve 26 taking the position indicated by dotted lines in Fig. 1 with its left hand end touching the right hand end of the plunger 43 which is held from moving to the left by the pressure on the outside of the release valve piston 30, and the triple valve piston comes to rest. In this position the release valve 30, 31 is on its seat and the plug valve 26 and slide valve 20 have closed the ports 24 and 25 and thus cut off communication between the auxiliary reservoir and the brake cylinder. The triple valve piston 3 however has not moved sufficiently far to the left to open the feed groove 10 and the port 44 communicating with the chamber 47 in the feed valve casing Fig. 2.

Assuming that the driver wishes to make a partial release of the brakes he increases the pressure in the train pipe by say 6 lbs. per square inch, by allowing air to flow from the main reservoir to the train pipe in the usual manner. This pressure acting on the train pipe side of the triple valve piston 3 is sufficient to move it to the left so as to uncover the feed groove 10 and feed port 44, and in this movement it moves the release valve 30, 31 off its seat 37 thus allowing air to flow from the brake cylinder to the atmosphere via port 14, passage 16, ports 36 and 38, cavity 39 and ports 41 to atmosphere. Whilst air is escaping from the brake cylinder to atmosphere as above described, air from the train pipe is flowing into the piston chamber 2 and thence through the feed groove 10 into the space 12 on the auxiliary reservoir side of the piston 3, and also through the port 44, pipe 46 (Fig. 2) into chamber 47 in the feed valve casing, past the feed valve 51 (which was opened by spring 58 owing to the reduction of train pipe pressure made for applying the brakes) and through port 45 into the space 12 and consequently into the auxiliary reservoir through port 13 so that the air pressure in the chambers on opposite sides of the triple valve piston 3 rapidly becomes equal. As the pressure on the outer side of the release valve piston 30, due to the pressure still left in the brake cylinder, is exerting a pressure through the plunger 43 it pushes the piston 3 to the right, cutting off the feed groove 10 and feed valve communication, via port 44, pipe 46, and port 45, between the train pipe and auxiliary reservoir, and also closes the exhaust from the brake cylinder to the atmosphere by moving the release valve 30, 31 on to its seat 37. During these operations the plug valve 26 has not opened communication between the auxiliary reservoir and brake cylinder. The above described operation will again take place if the driver again increases the train pipe pressure so that the release valve 30, 31 will be again opened, and the operations may be repeated until no pressure is left in the brake cylinder.

It will be understood that, for the purpose of effecting a graduated release of the brakes, equalization of pressure in the chambers on both sides of the triple valve piston 3 must take place rapidly so that the release valve 30, 31 may only be open for a short interval, otherwise all the pressure in the brake cylinder would be completely released to the atmosphere. To obtain the rapid equalization of pressure the ports 44, 45 with connecting pipe 46, and the feed valve, Fig. 2, controlling these ports, have been provided.

Further as the feed valve (Fig. 2) is, as hereinbefore mentioned, so constructed and arranged, or adjusted, that the valve 51 will be closed—thus shutting off communication, through the ports 44, 45 between the chambers 2 and 12 on opposite sides of the triple valve piston 3,—as soon as the train pipe pressure and consequently the pressure in chamber 47 and on diaphragm 54 (Fig. 2) of the feed valve reaches about 65 lbs. per square inch the equalization of pressure in the chambers 2 and 12 can then only take place slowly through the very small feed groove 10. In this way it is ensured that at the last when only a small amount of pressure remains in the brake cylinder, the release valve 30, 31 is held open long enough to allow the brake cylinder to completely exhaust and the brakes to be completely released before the full "running" pressure is obtained in the chamber 12 on the auxiliary reservoir side of the triple valve piston 3.

The difference in area exposed to pressure on the opposite sides of the triple valve piston 3 when in the "running" position shewn in Fig. 1—the auxiliary reservoir side then having the area of the plug valve 26 to be deducted from it—is sufficient to ensure that in the "running" position the piston 3 is kept to the left, i. e. in the position shewn in full lines, and the plug valve 26 on its seat 27. The release valve 30, 31, is, under these conditions, in equalization and is held off its seat 37 by the triple valve piston 3 through the medium of the plug valve 26 and rod 43, the light spring 42 being insufficient to push it home against the resistance offered by the plug valve 26 and parts connected therewith.

If after an application of the brakes the driver wishes to completely release his brakes he simply puts his brake valve in full release position and the air flowing into the train pipe until the running pressure of 75 lbs. per square inch is reached ensures that the triple valve piston 3 is held over to the left and the release valve 30, 31 kept open. It will be understood that in the case of an immediate full release of the brakes (without graduation) the driver's brake valve is as usual maintained in the "release" position so as to admit a continuous flow of air from the main reservoir to the train pipe and triple valves so that the pressure in the triple valve piston chamber 2 on the train pipe side of the piston 3 constantly increases until equalization, at the full "running" pressure, takes place on both sides of the piston 3.

In practice, for a triple valve piston of the size shewn in Fig. 1, the capacity or cross sectional area of the leak groove or port 10 would be about one fourth of that of the usual leak port in the piston chamber of the well known triple valves as employed in the Westinghouse air brake system; and the capacity or cross sectional area of the additional leak port 44 would be about four times that of the port 10.

While the advantages of being able to effect a graduated release of the brakes will be understood by those skilled in the art, it may be mentioned that it is advantageous to be able to effect a graduated release in cases where too heavy applications of the brakes have been made for "service" stops. In such a case with the apparatus according to this invention the brake power can be reduced without completely releasing the brakes and again applying them (as is necessary with existing apparatus) whereby objectionable shocks and waste of braking power are avoided, and a saving of time is effected.

Further with the apparatus according to this invention a partial recharging of the auxiliary reservoirs can be effected while retaining a partial brake application. This is advantageous for instance in the case of a long down grade where leakage may have depleted the pressure in the auxiliary reservoirs and brake cylinders, as it enables a partial recharging without complete release of the brakes which might be dangerous on a down grade. It avoids the use of pressure retaining valves requiring to be operated by hand for retaining pressure in the brake cylinders.

Generally the possibility of effecting a graduated release in the manner substantially as hereinbefore described provides for a more flexible and efficient control.

Variations might be made in the details of construction and arrangement of the various parts of the apparatus as hereinbefore described and shewn in the drawings, without departing from the main features of the invention. For instance instead of the feed valve casing 48 (Fig. 2) being a separate part screwed into the triple valve casing 1 the feed valve casing may be formed integrally with the casing 1, and in lieu of the pipe 46 a passage might be formed in the casing 1.

Further instead of the feed valve and additional feed parts controlled thereby, some other means might be provided whereby, after a certain pressure has been obtained in the train pipe, the speed of flow of the pressure fluid from the train pipe side of the triple valve piston 3 to the auxiliary reservoir side of the piston may be suitably reduced. For instance means might be provided for varying the effective area of the feed groove or feed ports through which the fluid passes from the train pipe side of the piston 3 to the opposite side thereof.

What I claim as my invention and desire to secure by Letters Patent is:—

1. In a fluid pressure brake, the combination, with a triple valve provided with passages for connecting it with a train pipe, a brake cylinder and an auxiliary reservoir, said triple valve having also a cylinder and a piston; of a stationary tubular member arranged in line with the said piston and provided with a lateral air passage and having a valve seat at one end which communicates with the brake cylinder passage, a tubular stem secured to the said piston and slidable over the tubular member and also provided with a lateral air passage, and a cylindrical plug valve also slidable with the said piston, said plug valve working in the said tubular member and closing its valve seat, the brake cylinder passage being placed in communication with the auxiliary reservoir passage when the piston and the parts connected to it are slid in one direction.

2. In a fluid pressure brake, the combination, with a triple valve provided with passages for connecting it with a train pipe, a brake cylinder and an auxiliary reservoir, said triple valve having also a cylinder, a piston and a slide valve for controlling the flow of fluid between the said passages; of an exhaust valve cylinder provided in its side wall with a lateral inlet connecting it with the brake cylinder passage and having a longitudinal exhaust outlet in one end communicating with the atmosphere, and a piston exhaust valve working in the exhaust valve cylinder and operatively connected with the aforesaid piston, the said exhaust outlet being closed by one end of the piston valve and the said inlet being closed by the periphery of the piston valve which slides over it.

3. In a fluid pressure brake, the combination, with a triple valve provided with passages for connecting it with a train pipe, a brake cylinder and an auxiliary reservoir, said triple valve having also a cylinder, a piston and a slide valve for controlling the flow of fluid between the said passages; of an exhaust valve cylinder provided with an inlet connecting it with the brake cylinder passage and an exhaust outlet, said outlet being of greater area than the said inlet, and a piston exhaust valve working in the exhaust valve cylinder and operatively connected with the aforesaid piston and operating to exhaust the fluid from the brake cylinder passage through the said inlet and outlet when the aforesaid piston has been moved by the pressure of the fluid from the train pipe to a predetermined extent.

4. In a fluid pressure brake, the combination, with a triple valve provided with passages for connecting it with a train pipe, a brake cylinder and an auxiliary reservoir, said triple valve having also a cylinder, a piston and a slide valve for controlling the flow of fluid between the said passages; of an exhaust valve cylinder arranged axially in line with the aforesaid cylinder, a piston exhaust valve working in the exhaust valve cylinder, a plunger arranged between the said piston exhaust valve and the aforesaid piston and permitting each to slide to a limited extent independently of the other, and a spring which normally holds the ends of the plunger in contact with the said piston exhaust valve and piston so that the fluid is exhausted from the brake cylinder passage when the aforesaid piston has been moved by the pressure of the fluid from the train pipe to a predetermined extent.

5. In a fluid pressure brake, the combination, with a triple valve provided with passages for connecting it with a train pipe, a brake cylinder and an auxiliary reservoir, said triple valve having also a cylinder and a piston; of a slide valve device comprising a stationary tubular member provided with a valve seat and having lateral ports, a sleeve secured to the aforesaid piston and slidable over the said tubular member and controlling its lateral ports, and a plug valve also secured to the aforesaid piston and slidable inside the said tubular member and adapted to close the passage through its valve seat, said valve device operating, when the pressure of the fluid in the train pipe is reduced, to place the auxiliary reservoir in communication with the brake cylinder passage.

6. In a fluid pressure brake, the combination, with a triple valve provided with passages for connecting it with a train pipe, a brake cylinder and an auxiliary reservoir, said triple valve having also a cylinder and a piston; of a slide valve device comprising a stationary tubular member provided with a valve seat at one end portion and lateral ports of different area arranged in its middle part at different distances from the said valve seat, a sleeve secured to the aforesaid piston and slidable over the said tubular member and controlling its said ports, and a plug valve also secured to the aforesaid piston and normally closing the passage through the said valve seat, said plug valve and sleeve operating to place the auxiliary reservoir passage in communication with the brake cylinder passage when moved in one direction.

7. In a fluid pressure brake, the combination, with a triple valve provided with passages for connecting it with a train pipe, a brake cylinder and an auxiliary reservoir, said triple valve having also a triple valve cylinder, a piston slidable therein, and a slide valve for controlling the flow of fluid between the said passages, the said triple valve cylinder having a small feed port and a relatively large feed port which are uncovered by the said piston to admit compressed air to the auxiliary reservoir passage; of a diaphragm chamber having an inlet passage connecting it with the said auxiliary reservoir passage, a pipe connection or duct between the diaphragm chamber and the other end portion of the triple valve cylinder from the auxiliary reservoir passage, a diaphragm in the diaphragm chamber, an inlet valve actuated by the said diaphragm and operating to close the said inlet passage when the pressure in the diaphragm chamber reaches a predetermined amount, thereby enabling the auxiliary reservoir to be charged rapidly through the said large feed port until the predetermined pressure is reached and thereafter slowly through the said small feed port; and an exhaust valve operatively connected with the piston of the said triple valve cylinder, the charging of the auxiliary reservoir being effected while the said exhaust valve is opened to partially exhaust the air from the said brake cylinder.

In testimony whereof I affix my signature.

JAMES WILLIAM CROSS.